Figure 1:
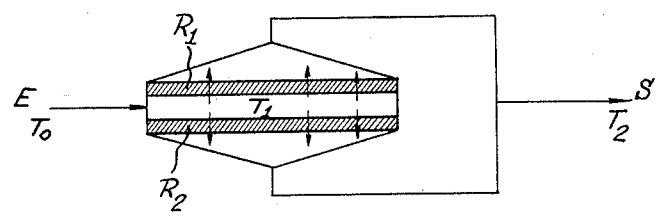

Dec. 22, 1964   M. DELASSUS ETAL   3,162,506
METHOD OF CARRYING OUT EXOTHERMIC REACTIONS CONTINUOUSLY
Filed April 26, 1962

United States Patent Office 3,162,506
Patented Dec. 22, 1964

3,162,506
METHOD OF CARRYING OUT EXOTHERMIC
REACTIONS CONTINUOUSLY
Marcel Delassus, Mazingarbe, Raymond Maux, Bully-les-Mines, and Pierre Vasseur, Vermelles, France, assignors to Houilleres du Bassin du Nord et du Pas-de-Calais, Douai, France
Filed Apr. 26, 1962, Ser. No. 191,400
Claims priority, application France, Apr. 28, 1961, 860,179
2 Claims. (Cl. 23—1)

This invention is concerned with a method of carrying out exothermic reactions in a continuous manner under adiabatic conditions, and with a reactor therefor.

It is known that exothermic reactions, whether they are catalysed or not, should take place within a temperature range defined by a lower limit which will be designated by $T_1$, below which the reaction rate is too slow for it to be able to be maintained of its own accord without further intervention, and an upper limit which will be designated by $T_2$ above which other products are formed than those desired or, if use is made of a catalyst or a packing, this deteriorates or is destroyed and the reactor itself may be damaged.

A number of means are used in order to prevent the temperature from exceeding the upper limit $T_2$ in the reaction space, such as limitation of the combination rate with recycling of the non-combined reagents; the provision in the catalytic space of a heat exchanger through which is circulated an appropriate fluid such as boiling mercury, molten metals or salts, oils, gases; dispersion of the reaction heat through a system of fins; or dilution of the reagents with an inert gas or steam. All these means have their respective advantages and disadvantages.

It is found that in a certain number of cases, the amount of heat released by a reaction effected in an adiabatic enclosure does not enable the products of the reaction to reach a temperature exceeding the upper limit $T_2$ if the reaction can be started from a sufficiently low temperature $T_0$. Since the reaction only acquires an adequate speed above the temperature $T_1$, the reagents must be brought from $T_0$ to $T_1$ by heat taken from the reaction zone and not from the products leaving the reactor at the temperature $T_2$ because the emerging products should be as hot as is permissible in order to evacuate the maximum amount of heat thus limiting the temperature $T_2$ to the tolerable maximum. This can be achieved by arranging in the reaction chamber a conventional heat exchanger consisting, for example, of a nest of tubes through which the cold reagents are passed before entering the reaction zone and are thus brought to the temperature $T_1$ at the expense of the reaction heat.

The fact remains, however, that the efficiency of such a heat exchanger is limited and that its presence in the reaction chamber not only considerably increases the volume of the latter but may also be the cause of leakages and other difficulties.

The present invention is based on the discovery that there is a maximum mass velocity below which there takes place, both through convection and through radiation, a propagation of heat in the opposite direction to the flow of the reagents, which phenomenon may be termed generally "thermal retrodiffusion" and which is of a sufficient value to raise the temperature of the reagents to the value $T_1$ at the expense of the heat produced in the reaction chamber, which is thus cooled.

This mass velocity is fixed at such a value that the heat transfer rate through conduction and radiation is sufficient in relation to the transport rate of the heat $(G\ C_p)$ for the reagents to be heated from the temperature $T_0$ to $T_2$ in the space immediately preceding the reaction zone. For certain reactions in the gaseous phase it has been found to be of the order of 0.0025 to 0.20 g./cm.$^2$/second.

It is thus possible, without any other means, to introduce the reagents into the reaction chamber at a sufficiently low temperature $T_0$ for the reaction to take place of its own accord without $T_2$ exceeding the fixed value.

Such conditions are easily obtained when the reaction involved is very rapid and, above all, when it takes place at a high temperature, such as the oxidation of $NH_3$ to NO on platinum gauze or the oxidation-dehydrogenisation of methanol into formaldehyde on silver for example.

For slower reactions and particularly when the temperature $T_2$ is relatively low, very low mass velocities are required to obtain such conditions and hence the reaction chamber must be of excessively large section which prohibits industrial application of the procedure.

We have found that it is possible to satisfy these conditions industrially by giving the reaction chamber a considerable section in relation to its length and by admitting the reagents into a space which is bounded on two faces by two reaction zones, as illustrated in FIGURE 1 of the accompanying drawing.

In this figure, the reaction zones $R_1$ and $R_2$ are constituted by two thin layers of granular or porous material, which may be catalytic or not. The ratio of thickness to surface area of these layers is preferably 1.5 to 15 cm./cm.$^2$. The reagents, entering at E at the temperature $T_0$, come between the two zones $R_1$ and $R_2$ where, because of the relatively large section of the apparatus, they remain for a sufficiently long time to be brought to the lower temperature limit $T_1$. Then they pass through the reaction zones where the reaction takes place. Since some of the reaction heat has been removed in order to bring the reagents from $T_0$ to $T_1$, the exit temperature $T_2$ of the products leaving at S remains limited to the required value.

It will be noted that with this arrangement, no heat exchange can take place between the reaction products and the reagents, which would be contrary to the object aimed at, because the reintroduction of heat into the reactor would lead to the temperature limit $T_2$ being exceeded.

Figure 2:
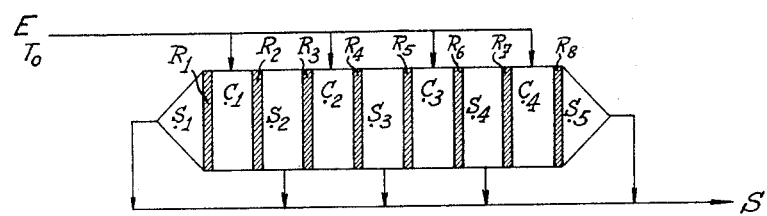

A further embodiment of reactor enabling the advantages of the present invention to be obtained is shown diagrammatically in FIGURE 2 of the accompanying drawing.

In this FIGURE 2, the reagents arriving at E at the temperature $T_0$ are distributed into admission chambers $C_1$, $C_2$, $C_3$, $C_4$ where, in contact with the reaction zones $R_1$, $R_2$, $R_3$, $R_4$, $R_5$, $R_6$, $R_7$, $R_8$, they are heated up to $T_1$, then pass through the reaction zones; the products of the reaction are collected in the exit chambers $S_1$, $S_2$, $S_3$, $S_4$, $S_5$ to escape at S.

Such an arrangement enables the reaction space to be given a considerable total surface for a given volume, in a compact form and without the disadvantages of reactors with tubular heat exchangers.

Although the reactor is illustrated as being arranged horizontally in FIGURE 2, it could equally well be arranged vertically, which would reduce the area occupied, and when the reaction zones are packed with a catalyst with a low mechanical strength and distributed in thin layers, there is no risk of the catalyst being crushed by its own weight.

The arrangement of the reaction zone in thin layers and the low mass velocity which are characteristic of the invention, have the further advantage of considerably reducing the pressure loss caused by the entry into the reaction zone. Moreover, the arrangement described permits great flexibility in operation by enabling a larger or smaller number of the elements constituting the reactor to be brought into operation and by permitting an extension of the dimensions of the reaction zone which is limited only by mechanical factors.

What we claim is:

1. A method of continuously carrying out exothermic reactions in a gaseous phase under adiabatic conditions, which comprises supplying the reagents to at least one space which is bounded in part by at least two reaction zones, the thickness of the reaction zones being small in relation to their other two dimensions, the reagents being supplied to said space at a temperature at which the reaction rate is too slow for the reaction to be maintained of its own accord, and the reagents being passed from said space through the thickness of the reaction zones with a mass velocity in the range from 0.0025 to 0.02 gm./cm.$^2$/second to ensure preheating of the reagents in said space before their entry into the reaction zones, by thermal retrodiffusion of heat released in the reaction zone, to a temperature at which the reaction rate is sufficient for the reaction to be maintained of its own accord.

2. A method according to claim 1; wherein the reaction zones have a ratio of thickness to surface area of 1.5 to 15 cm./cm.$^2$.

References Cited in the file of this patent

UNITED STATES PATENTS

| | | |
|---|---|---|
| 1,685,759 | Walter | Sept. 25, 1928 |
| 2,354,640 | Becker | July 25, 1944 |
| 2,798,819 | Schaumann | July 9, 1957 |
| 2,850,360 | Bottenberg | Sept. 2, 1958 |
| 2,890,929 | Rummert | June 16, 1959 |
| 3,048,468 | Watkins | Aug. 7, 1962 |

FOREIGN PATENTS

| | | |
|---|---|---|
| 647,594 | Great Britain | Dec. 20, 1950 |